US007436088B2

(12) United States Patent
Miura

(10) Patent No.: US 7,436,088 B2
(45) Date of Patent: Oct. 14, 2008

(54) ELECTROMAGNETIC EXCITER

(75) Inventor: Naoki Miura, Fujiyoshida (JP)

(73) Assignee: Citizen Electronics Co., Ltd., Yamanashi-Ken (JP)

( * ) Notice: Subject to any disclaimer, the term of this patent is extended or adjusted under 35 U.S.C. 154(b) by 433 days.

(21) Appl. No.: 11/339,324

(22) Filed: Jan. 24, 2006

(65) Prior Publication Data

US 2006/0226714 A1 Oct. 12, 2006

(30) Foreign Application Priority Data

Jan. 24, 2005 (JP) ............................ 2005-014919

(51) Int. Cl.
*H02K 41/00* (2006.01)

(52) U.S. Cl. ...................... 310/14; 340/407.1; 381/396; 381/433

(58) Field of Classification Search .................. 310/36, 310/12, 14; 340/407.1; 381/396, 400-422, 381/433
See application file for complete search history.

(56) References Cited

U.S. PATENT DOCUMENTS 3,663,907 A * 5/1972 Barkow ...................... 335/211
4,720,644 A * 1/1988 Sedlak ..................... 310/49 R
7,030,522 B2 * 4/2006 Nakajima et al. ............. 310/81
2006/0072248 A1 * 4/2006 Watanabe et al. ........... 360/318
2006/0158048 A1 * 7/2006 Kobayashi et al. ............ 310/12
2006/0226714 A1 * 10/2006 Miura ......................... 310/12
2006/0244400 A1 * 11/2006 Miura ........................ 318/128
2007/0194635 A1 * 8/2007 Miura ......................... 310/15
2007/0236088 A1 * 10/2007 Miura ......................... 310/15

FOREIGN PATENT DOCUMENTS

JP 2001-239210 9/2001

* cited by examiner

*Primary Examiner*—James Harvey
(74) *Attorney, Agent, or Firm*—Brinks Hofer Gilson Lione

(57) ABSTRACT

An electromagnetic exciter includes a magnetic circuit device composed of an outer yoke, a flat magnet arranged within the outer yoke, and an inner yoke mounted on the magnet, and a casing within which the magnetic circuit device is contained. The casing has a flat plate and a cylindrical wall. A magnetic gap is defined between the side wall of the outer yoke and the outer peripheral wall of the inner yoke. A voice coil is secured to the flat plate of the casing and inserted into the magnetic gap. A suspension extends between the cylindrical wall of the casing and the magnetic circuit device so that the magnetic circuit device is supported by the casing. An annular weight is secured around the outer yoke. The suspension has openings. The weight has projections loosely fitted within the openings.

5 Claims, 3 Drawing Sheets

ELECTROMAGNETIC EXCITER

This application claims priority under 35 U.S.C. §119 to Japanese Patent Application No. 2005-014919 filed Jan. 24, 2005, the entire content of which is hereby incorporated by reference.

FIELD OF THE INVENTION

The present invention relates to electromagnetic exciters incorporated into a cellular phone, a wireless personal digital assistant and other mobile communication terminals and vibrated to inform a user of the reception of an incoming call.

BACKGROUND OF THE INVENTION

Conventionally, a cellular phone, a wireless personal digital assistant and other mobile communication units or terminals are configured to inform the user of the reception of an incoming call by selectively emitting a beep sound or a melody, or causing their housings to vibrate. One example of such mobile communication units includes a microspeaker combined with a vibrator. The vibrator includes a weight rotated by a small motor to produce vibrations. The resulting combination, however, makes it difficult to reduce the size of the unit as well as the production cost. There has recently been proposed an electromagnetic exciter or multifunction speaker designed to produce both sounds and vibrations, as disclosed in Japanese patent application publication No. 2001-239210.

Referring specifically to FIG. 4, a conventional electromagnetic exciter, as shown in Japanese patent application publication No. 2001-239210, includes a cylindrical casing 12 made of synthetic resin. A diaphragm 13 is secured to the upper peripheral edge of the casing 12. The exciter also includes a magnetic circuit device which comprises an outer yoke 16 in the form of a cylindrical cup, a cylindrical, axially magnetized permanent magnet 15, and an inner yoke 17 secured on the top of the permanent magnet 15. A voice coil 14 is attached to the diaphragm 13 and inserted into a magnetic gap formed in the magnetic circuit device. The outer yoke 16 and the inner yoke 17 are both made of a high magnetic permeability material.

The magnetic circuit device is connected to the casing 12 by a suspension spring 18. The suspension spring has a plurality of arms, each of extends between the outer yoke 16 of the magnetic circuit device and the casing 12 and is configured to resiliently suspend the outer yoke 16. This arrangement allows the magnetic circuit device to be vibrated in the axial direction of the exciter.

The outer yoke 16 has an integrally formed outer ring which serves as an additional weight 19 for reducing the natural frequency of the magnetic circuit device to a sufficient extent. It should be understood that a discrete weight may be made of a material different from that of the outer yoke 16 and may be connected to the outer yoke 16.

The permanent magnet 15 provides a magnetic flux to form a strong magnetic field in the magnetic gap defined between the peripheral side wall of the inner yoke 17 and the upper side of the outer yoke 16. With this arrangement, the diaphragm 13 is vibrated to produce acoustic sounds when an electric current having acoustic frequencies flows through the voice coil 14. The casing 12 is secured, for example, to the housing of an acoustic device.

FIGS. 5 and 6 show another conventional electromagnetic exciter wherein a weight is made of a material different from that of an outer yoke and is secured to the outer yoke. As shown better in FIG. 6, the electromagnetic exciter includes a magnetic circuit device 20 composed of an outer yoke 21 having a bottom wall and a cylindrical side wall extending upwardly from the bottom wall, a flat magnet 22 arranged within the outer yoke 21, and an inner yoke 23 mounted on the top of the magnet 22. A magnetic gap g is defined between the side wall of the outer yoke 21 and the inner yoke 23 to receive a voice coil 24. The exciter includes a casing 25. The casing 25 has an outer sleeve 25*b*, an inner sleeve 25*c*, and a flat plate 25*a* mounted on the upper end of the outer sleeve 25*b*. The voice coil 24 is secured to the flat plate 25*a*. The outer sleeve 25*b* of the casing 25 has an open bottom closed by a cover 25*d*. This cover may be in the form of a dust mesh or a metal plate.

As shown better in FIG. 5, a suspension 26 includes an inner ring 26*a*, an outer ring 26*b* arranged in a concentric relation to the inner ring 26*a*, and two arcuate arms 26*c* for providing a connection between the inner ring 26*a* and the outer ring 26*b*. The suspension 26 extends between the outer yoke 21 of the magnetic circuit device 20 and the casing 25. More specifically, the inner ring 26*a* of the suspension 26 is connected to the outer yoke 21 of the magnetic circuit device 20. The outer sleeve 25*b* has an inwardly extending flange. The outer ring 26*b* of the suspension 26 is sandwiched between the inner flange of the outer sleeve 25*b* and the upper end of the inner sleeve 25*c*. As shown in FIG. 6, an annular weight 27 has an inner diameter portion 27*a* fitted around the outer yoke 21. The annular weight 27 is made of a material with a high specific gravity such as tungsten. The suspension 26 may be formed by, for example stamping a blank made of spring steel.

A double-sided adhesive tape 28 is attached to the top of the flat plate 25*a* so as to secure the electromagnetic exciter to, for example, a cell phone housing 29. With this arrangement, vibration of the voice coil 24 is transmitted through the casing 25 to the housing 29 of the cell phone.

In the prior art exciter, the annular weight is made of a material with a high specific gravity such as tungsten. This results in an increase in the production cost of the overall electromagnetic exciter. The electromagnetic exciter, as shown, has such a limited space that the annular weight can not have a sufficient mass.

It is, therefore, an object of the present invention to provide an electromagnetic exciter which can accommodate a weight of a sufficient mass.

SUMMARY OF THE INVENTION

According to the present invention, there is provided an electromagnetic exciter comprising a magnetic circuit device including an outer yoke having a cylindrical side wall and a bottom wall connected to one end of the side wall, a magnet disposed within and arranged on the bottom wall of the outer yoke, an inner yoke mounted on the magnet, and a magnetic gap between the inner yoke and the side wall of the outer yoke, a voice coil inserted into the magnetic gap, a casing dimensioned to contain the magnetic circuit device and the voice coil and having a cylindrical wall disposed around the magnetic circuit device, a suspension connected between the cylindrical wall of the casing and the magnetic circuit device, and a weight extending from the side wall of the outer yoke. The suspension includes an inner section secured to the side wall of the outer yoke, an outer section secured to the cylindrical wall of the casing, and a connecting section for interconnecting the inner and outer sections. The suspension includes at least one opening between the outer section, the inner section and the connecting section. The weight includes at least one projection extending through the suspension and loosely fitted within the at least one opening.

The electromagnetic exciter can effectively increase the mass of the weight while being maintained compact so as to be suitable for use in various small electronic devices such as a cell phone.

In one embodiment, the side wall of the outer yoke has a circular cylindrical shape. The cylindrical wall of the casing has a circular cylindrical shape and is coaxially disposed around the side wall of the outer yoke. The inner and outer sections of the suspension have an annular shape and are coaxially disposed around the circular cylindrical wall of the outer yoke. The connecting section includes at least two arcuate regions circumferentially spaced from each other and coaxially disposed around the circular cylindrical wall of the outer yoke, and connecting regions extending between one end of the arcuate region and the inner region and extending between the other end of the arcuate region and the outer section. The at least one opening includes two outer opening defined between the arcuate regions and the outer section, and two inner openings defined between the arcuate regions and the inner section. There are provided two of the projections which are loosely fitted within the outer openings.

In another embodiment, the outer opening has a radial width greater than the radial width of the inner opening.

In a further embodiment, the outer yoke has an annular flange extending radially outwardly from the side wall of the outer yoke. The annular flange has a first face and an opposite second face. The inner section of the suspension is secured to the first face of the annular flange. The weight is contacted with the second face of the annular flange and secured around the side wall of the outer yoke.

In one embodiment, the casing includes an end plate disposed to close one end of the cylindrical wall of the casing and adapted to support the voice coil.

BRIEF DESCRIPTION OF THE DRAWINGS

The present invention may be best understood by reference to the following description when taken in conjunction with the accompanying drawings in which.

DETAILED DESCRIPTION OF THE PREFERRED EMBODIMENTS

Figure 1:
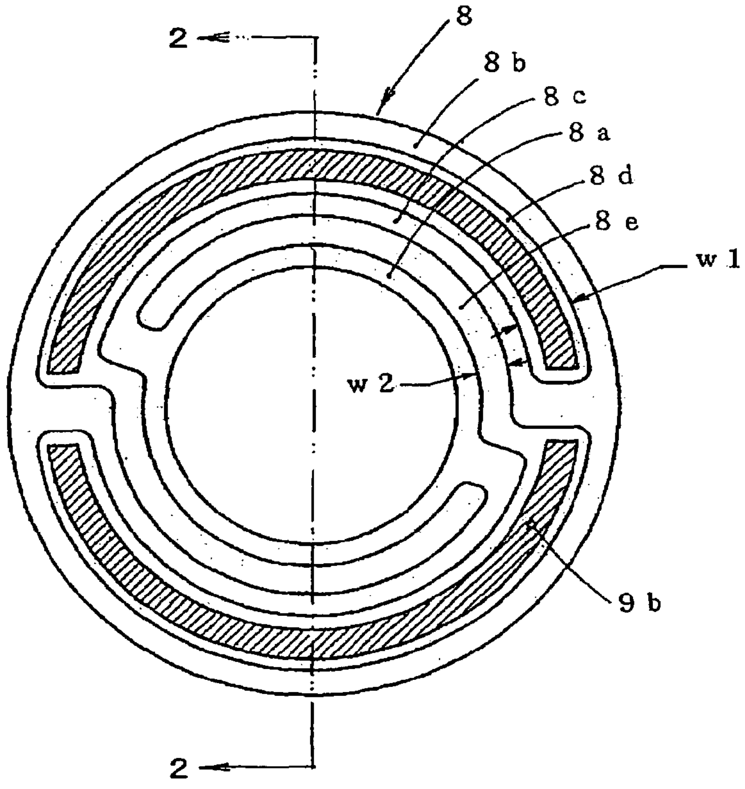
FIG. 1 is a plan view of a suspension used with an electromagnetic exciter according to the present invention.
Figure 2:
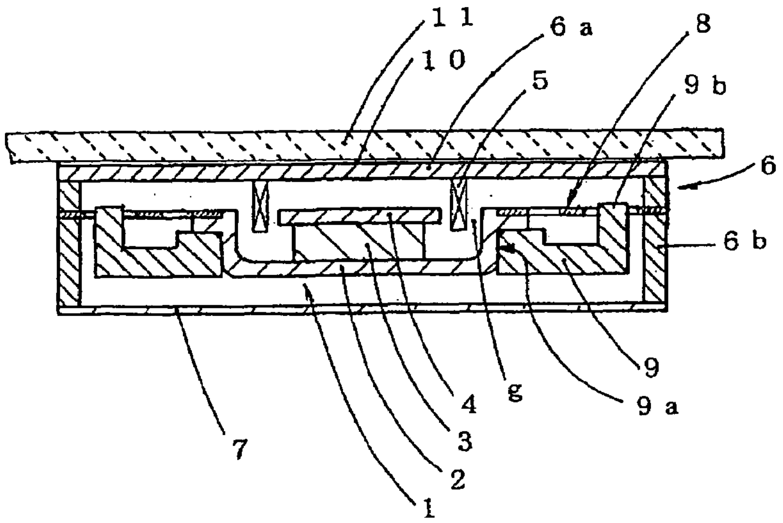
FIG. 2 is a sectional view of the electromagnetic exciter attached to a panel or a housing of an electronic device as seen in a direction indicated by the arrow 2-2 in FIG. 1.
Figure 3:
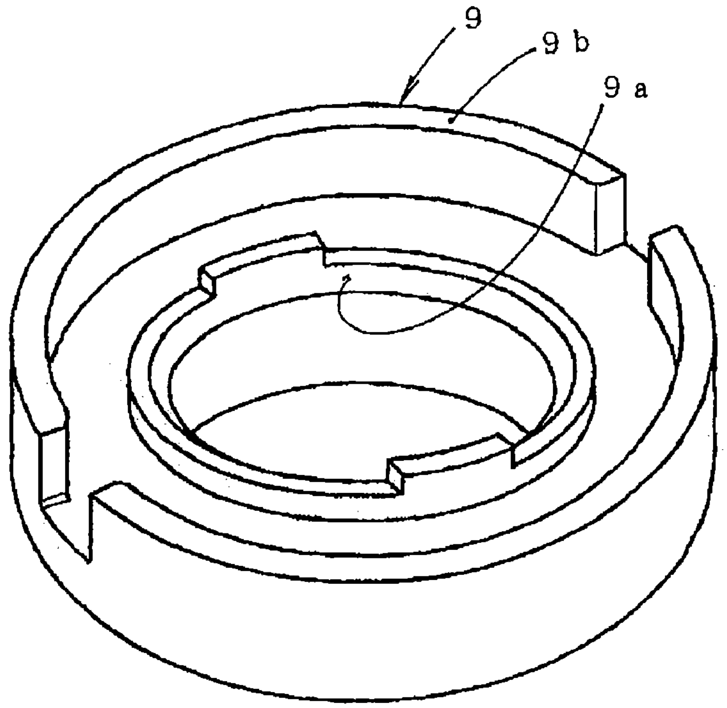
FIG. 3 is a perspective view of a weight shown in FIG. 2.
Figure 4:
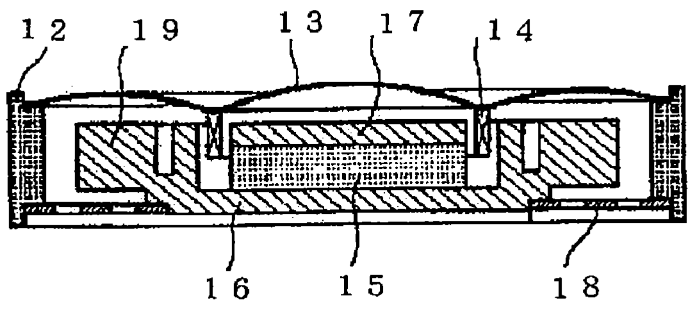
Fig. 4 Prior Art
FIG. 4 is a sectional view of a known electromagnetic exciter omitting a tip wall and a casing.
Figure 5:
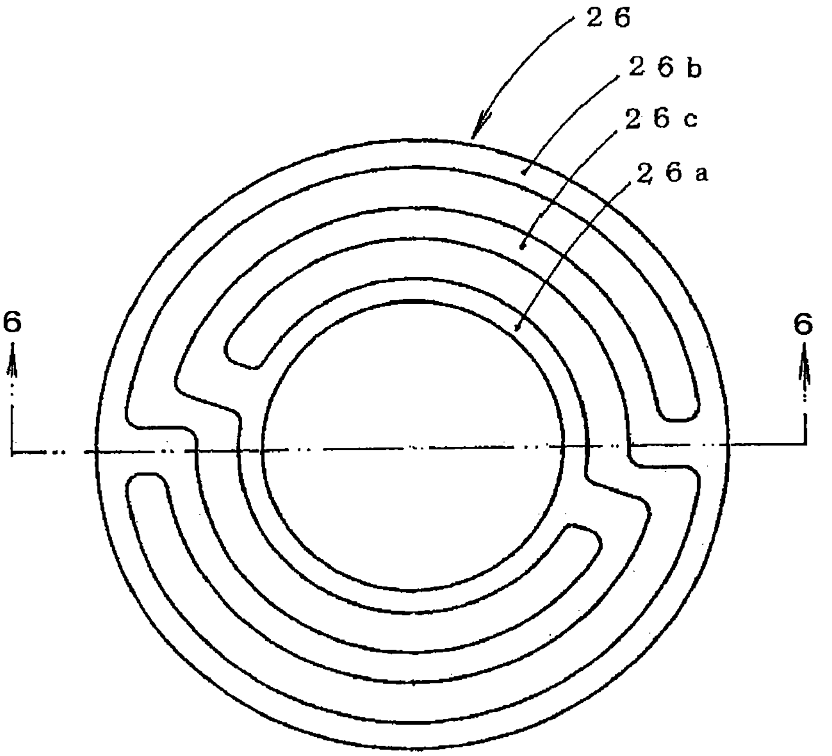
Fig. 5 Prior Art
FIG. 5 is a plan view of a suspension used in another known electromagnetic exciter
Figure 6:
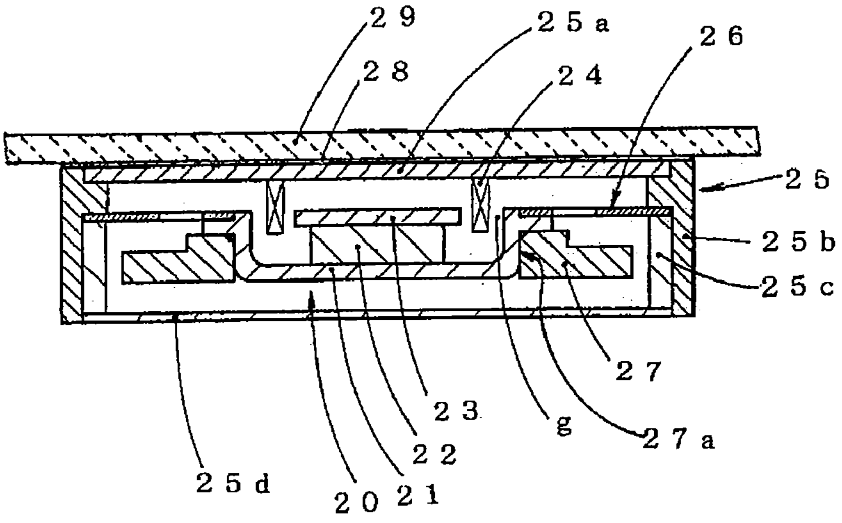
Fig. 6 Prior Art
FIG. 6 is a sectional view of the known electromagnetic exciter including the suspension in FIG. 5 as seen in a direction indicated by the arrow 6-6 in FIG. 5.

Referring to FIGS. 1 to 3, there is illustrated an electromagnetic exciter assembled according to the present invention.

As shown in FIG. 2, an electromagnetic exciter includes a magnetic circuit device 1, as is conventional. The magnetic circuit device 1 includes an outer yoke 2 having a bottom wall and a cylindrical side wall connected to the bottom wall, a flat magnet 3 arranged on the bottom wall of the outer yoke 2, and a flat inner yoke 4 mounted on the top of the magnet 3. A magnetic gap g is defined between the side wall of the outer yoke 2 and the outer peripheral wall of the inner yoke 4 to receive a voice coil 5. The voice coil 5 has a copper winding with an open center. The copper winding is covered with an enamel layer. A casing 6 includes a top wall 6*a* disposed over the magnetic circuit device 1 and a cylindrical side wall 6*b* connected to the top wall 6*a*. The voice coil 5 is secured onto the top wall 6*a* of the casing 6. The casing has an open bottom covered by a closure 7 such as a dust mesh and a metal plate. A suspension 8 is connected between the upper end of the outer yoke 2 and the side wall 6*b* of the casing 6 so that the magnetic circuit device 1 is resiliently supported by the casing as will hereinafter be described in detail. By this arrangement, the magnetic circuit device 1 is capable of axial vibration.

As shown best in FIG. 1, the suspension 8 includes an inner ring 8*a*, an outer ring 8*b* concentrically disposed around the inner ring 8*a* and two arcuate arms 8*c* connected between the inner ring 8*a* and the outer ring 8*b*. The suspension 8 may be formed by, for example, stamping a blank made of spring steel. An arcuate outer opening 8*d* is defined between the outer ring 8*b* and the arm 8*c* and has a width w1. Also, an arcuate inner opening 8*e* is defined between the inner ring 8*a* and the arm 8*c* and has a width w2. The width w1 is formed greater than the width w2.

Referring back to FIG. 2, an additional mass or annular weight 9 has an inner diameter portion 9*a* tightly fitted around the side wall of the outer yoke 2. Two arcuate projections 9*b* extend upwardly from the outer peripheral edge of the weight 9. The projections 9*b* are loosely fitted within the respective outer openings 8*d* and extend upwardly through the outer openings 8*d*. The projections 9*b* will in no way interfere with the suspension 8 during vibration of the magnetic circuit device 1.

The electromagnetic exciter is secured to a panel or a housing 11 of an electronic device such as a cell phone by the use of a double-sided adhesive tape 10. The adhesive tape 10 is attached to the top wall 6*a* of the casing 6.

The weight 9 has a mass greater than that of the prior art weight so that the weight 9 prevents undue displacement of the magnetic circuit device 1 and avoid the occurrence of metal fatigue in the suspension. This is made possible by widening the outer openings 8*d* and allowing the projections 9*d* to extend upwardly through the respective outer openings 8*d* of the suspension 8.

As thus far described, the present invention provides an electromagnetic exciter which is simple in structure, reliable in operation, and economical to manufacture.

In the illustrated embodiment, the casing 6 and the suspension 8 have a circular shape. The present invention is not limited thereto. The casing 6 and the suspension 8 may take a polygonal or other shapes. As an alternative, the shape of the casing 6 may differ from the shape of the suspension 8.

Illustratively, the projections 9*b* are loosely fitted within the outer openings 8*d*. Alternatively, the projections 9*b* may be loosely fitted within the inner openings 8*e*. In the alternative case, the arcuate inner opening 8*e* may be made wider than the arcuate outer opening 8*d*. However, it is preferable that the projections 9*d* is arranged in the outer openings as stated above, which enables the projection to be large as compared with the alternative case. Still alternatively, the projections 9*b* may be loosely fitted within both the inner and outer openings 8*d*, 8*e*, or any other portions of the suspension 8.

In the illustrated embodiment, the outer yoke 2 and the weight 9 are discrete members. Alternatively, the weight 9 may be integrally formed with the outer yoke 2.

In the illustrated embodiment, the electromagnetic exciter is incorporated into a cell phone. The electromagnetic exciter may, of course, be used with any other electronic devices.

Although the present invention has been described with respect to its preferred embodiments, various changes and modifications may be made without departing from the scope of the appended claims.

Although the present invention has been described in terms of specific embodiments, it is anticipated that alternations and modifications thereof will no doubt become apparent to those skilled in the art. It is therefore intended that the following claims be interpreted as covering all such alternations and modifications as fall within the true sprit and scope of the invention.

The invention claimed is:

1. An electromagnetic exciter comprising:

a magnetic circuit device including an outer yoke having a cylindrical side wall and a bottom wall connected to one end of said side wall, a magnet disposed within and arranged on the bottom wall of said outer yoke, and an inner yoke mounted on said magnet, said magnetic circuit device defining a magnetic gap between said inner yoke and said side wall of said outer yoke;

a voice coil inserted into said magnetic gap;

a casing dimensioned to contain said magnetic circuit device and said voice coil, said casing having a cylindrical wall disposed around said magnetic circuit device;

a suspension connected between said cylindrical wall of said casing and said magnetic circuit device; and a weight extending from said side wall of said outer yoke, wherein said suspension includes an inner section secured to said side wall of said outer yoke, an outer section secured to said cylindrical wall of said casing, and a connecting section for interconnecting said inner and outer sections, said suspension including at least one opening among said outer section, said inner section and said connecting section; and wherein said weight includes at least one projection extending through said suspension and loosely fitted within said at least one opening.

2. An electromagnetic exciter according to claim 1, wherein said side wall of said outer yoke has a circular cylindrical shape;

wherein said cylindrical wall of said casing has a circular cylindrical shape and is coaxially disposed around said side wall of said outer yoke;

wherein said inner and outer sections of said suspension have an annular shape and are coaxially disposed around said circular cylindrical wall of said outer yoke;

wherein said connecting section includes at least two arcuate regions circumferentially spaced from each other and coaxially disposed around said circular cylindrical wall of said outer yoke; and connecting regions extending between one end of said arcuate region and said inner region and extending between an other end of said arcuate region and said outer section;

wherein said at least one opening includes outer openings defined between said arcuate regions and said outer section, and inner openings defined between said arcuate regions and said inner section; and wherein said at least one projection includes two projections which are loosely fitted within corresponding said outer openings, respectively.

3. An electromagnetic exciter according to claim 2, wherein said inner opening has a radial width, and said outer opening has a radial width greater than said radial width of said inner opening.

4. An electromagnetic exciter according to claim 3, wherein said outer yoke has an annular flange extending radially outwardly from said side wall of said outer yoke and having a first face and an opposite second face, said inner section of said suspension being secured to said first face of said annular flange, said weight being contacted with said second face of said annular flange and secured around said side wall of said outer yoke.

5. An electromagnetic exciter according to claim 1, wherein said casing includes an end plate disposed to close one end of said cylindrical wall of said casing and adapted to support said voice coil.

* * * * *